United States Patent

[11] 3,559,744

| [72] | Inventor | James D. Olinger<br>4912 N. Sipple, Spokane, Wash. 99206 |
|---|---|---|
| [21] | Appl. No. | 744,443 |
| [22] | Filed | July 12, 1968 |
| [45] | Patented | Feb. 2, 1971 |

[54] HITCH FOR ROTARY CULTIVATOR
4 Claims, 4 Drawing Figs.

[52] U.S. Cl. .................................................. 172/47,
172/123, 172/264, 172/439
[51] Int. Cl. ................................................... A01b 33/02,
A01b 61/00, A01b 59/043
[50] Field of Search ........................................... 172/47.117,
264, 261, 265—268, 47, 51, 55, 705, 60, 448,
118—121, 123, 551, 572, 710; 267/73

[56] References Cited
UNITED STATES PATENTS
| 672,572 | 4/1901 | Schley ........................ | 172/264 |
| 1,084,918 | 1/1914 | Zelle ........................... | 172/448X |
| 2,408,361 | 10/1946 | Bagan .......................... | 172/119 |
| 2,851,904 | 9/1958 | Banek .......................... | 172/705X |
| 3,041,060 | 6/1962 | Jacobson ...................... | 267/73X |

*Primary Examiner*—Robert E. Pulfrey
*Assistant Examiner*—Stephen C. Pellegrino
*Attorney*—Wells, St. John and Roberts ABSTRACT: A hitch improvement for a rotary cultivator of the type including a rotatable blade assembly powered by a supporting tractor so as to rotate the lower portion of the blade assembly in a rearward direction during forward movement of the tractor. The present improvement provides an extensible linkage which permits the cultivator frame to swing forwardly upon engagement of an obstruction by the rotating blade. The hitch is biased by a spring which normally retains the hitch assembly and cultivator in the required conventional configuration.

PATENTED FEB 2 1971

3,559,744

INVENTOR.
James D. Olinger
BY
Wells & St. John
Attys.

3,559,744

1

HITCH FOR ROTARY CULTIVATOR

BACKGROUND OF THE INVENTION

This disclosure is concerned with an improvement in the mounting hitch for a rotary cultivating implement. Such implements are mounted transversely across the back of a tractor. They have a transverse bladed assembly rotatably mounted on a supporting shaft. The bladed assembly is in ground engagement when operative. It is rotated so that the lower portion of the blade assembly turns in a rearward direction to break up and cultivate the soil as the tractor moves forwardly.

Considerable torque is applied to the bladed assembly. Under conventional conditions, damage to the drive train for the bladed assembly due to engagement of the obstruction such as rocks is very common. When such an obstruction interferes with the rotation of the bladed assembly damage usually occurs to the clutch or other portions of the transmission on the implement. Conventional hitchs used for such devices do not include means for providing yieldability of the assembly.

Yieldable mountings have been applied previously to implements such as plows, permitting the plows or other devices to move rearwardly and upwardly to clear an obstruction. However, the rotational movement of a rotary cultivator blade assembly is such as to require forward movement to ride over an obstruction. The torque transmitted to the implement frame is such as to pivot the frame in a forward direction beneath its supporting pivotal axis on the tractor. It therefore is necessary to provide special yieldability in the hitch to accommodate this uncommon force relationship.

According to the present device, this yieldable feature is provided by a spring biased assembly interposed in the central linkage of a three point hitch. It permits yieldable extensions of the center linkage when required due to an obstruction being encountered by the rotating blade. This permits the blade to ride over the obstruction due to its to rotational movement, without seriously slowing down or damaging the drive train to the bladed assembly.

SUMMARY OF THE INVENTION

The invention set out herein relates to an improvement in a three point hitch assembly for mounting a rotary cultivating implement to supporting vehicle frame. The improvement concerns the angular positioning means or central linkage of the hitch. An extensible linkage is pivotally connected to the vehicle framework at one end and to the implement framework at the other end to permit the implement frame to swing forwardly beneath its transverse pivotal support axis on the vehicle framework. A biasing spring normally urges the linkage to a collapsed condition, but permits extension when adequate force is applied thereto.

It is a first object of the invention to provide an improved hitch assembly for a rotary cultivator capable of normally allowing the cultivator to operate under powered conditions without yieldable movement. Provision is made for yielding of the linkage when required by the encountering of a substantial obstacle to rotation of the bladed assembly.

Another object of the invention is to provide such an improvement in a conventional three point hitch assembly for a rotary cultivator which is readily adaptable to any conventional hitch apparatus.

Another object of the invention is to provide an economical adapter for such yieldable movement and to utilize as few moving parts as possible in accommodating the yieldable movement. The entire apparatus is enclosed so that the moving parts are not subjected to wear or damage.

These and other objects will be evident from the following disclosure, which sets out in detail one preferred form of the invention. It is to be understood that modifications might be made in some structural areas without deviating from the intended scope of the disclosure.

DESCRIPTION OF THE PREFERRED EMBODIMENT

Figures 1, 2, 3, 4:
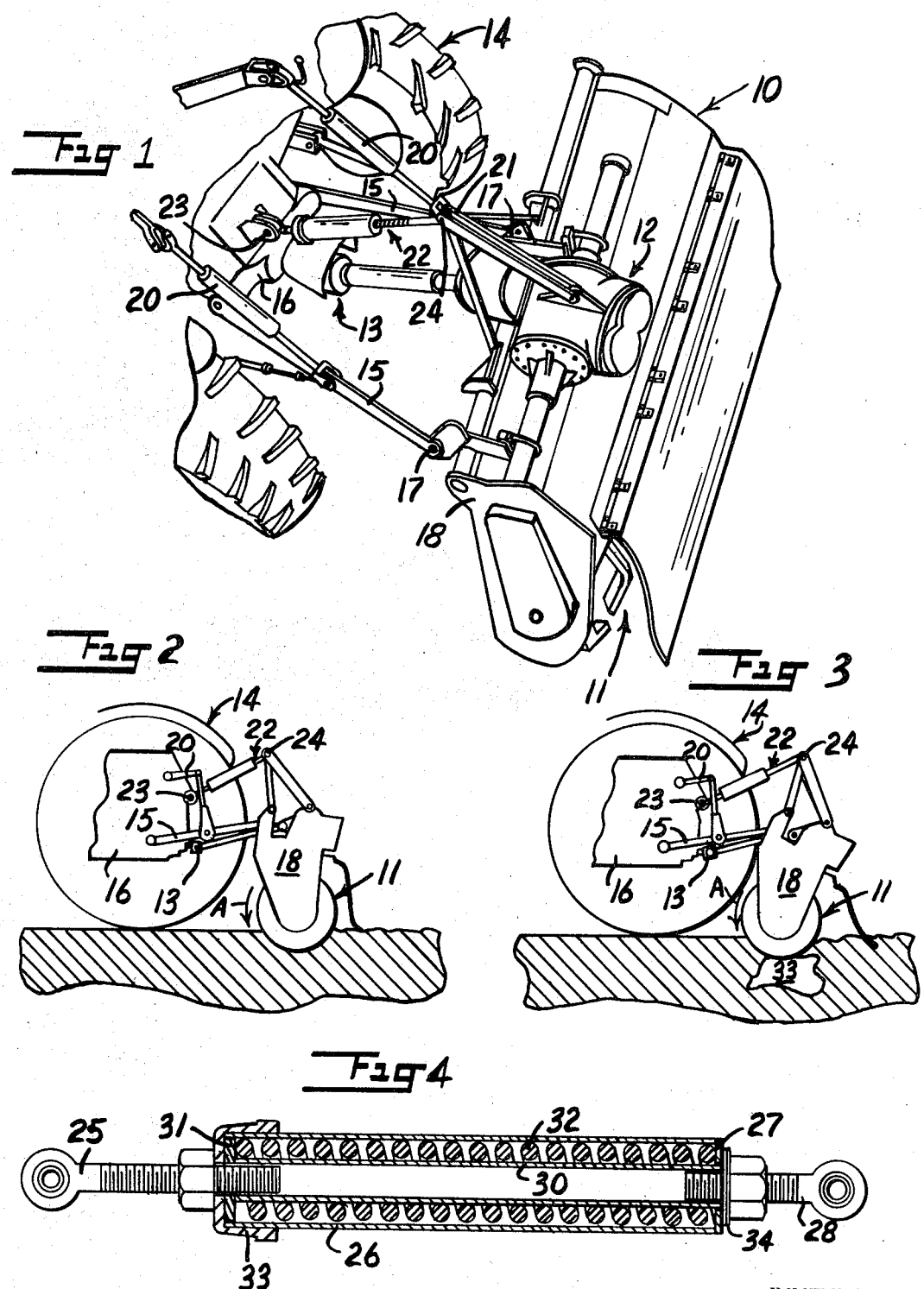
FIG. 1 is fragmentary perspective view of the cultivator and hitch assembly, showing its manner of mounting at the rear of the tractor.
FIG. 2 is a schematic side view showing the basic components of the apparatus in normal operating conditions.
FIG. 3 is a view similar to FIG. 2 showing the components yielding to overcome an obstruction.
FIG. 4 is a sectional view through the extensible linkage attachment.

The basic implement apparatus with which the present hitch improvement is concerned is shown generally at 10 in FIG. 1. It is a powered rotary cultivator having a bladed assembly 11 including a series of transversely spaced blade members mounted along a rotatable shaft in such fashion as to directly engage and break up the earth surface contacted thereby. The bladed assembly is powered by a transmission 12 coupled to the power takeoff connection 13 of a tractor 14 in the conventional manner. The bladed assembly 11 is operatively rotated as indicated by arrow A in FIGS. 2 and 3.

The rotary cultivator is supported at the rear of tractor 14 by a three point hitch. The three point hitch includes transversely spaced identical support arms 15 pivotally connected at their forward ends to the tractor framework 16 and pivotally connected at 17 to the frame 18 of the rotary cultivator implement 10. The arms 15 are angularly positioned relative to the tractor framework 16 by a vertical positioning mechanism 20 of conventional design, normally used to elevationally locate the position of the pivotal connections 17 relative to the supporting ground surface.

The bladed assembly 11 on the implement 10 is mounted for rotation about first transverse axis on the implement frame 18. The pivotal connections 17, which are coaxial, provide a second transverse axis along which the implement frame 18 is pivotally connected to the vehicle framework 16, the axis at 17 being above and parallel to the rotational axis of the blade assembly 11.

At the center of the apparatus is the third hitch connection to the tractor 14. This connection conventionally is used to angularly locate the implement frame 18 about the axis of the pivotal connections 17 at its respective sides. It includes a fixed linkage 21 which in effect is a rigid extension of the implement frame 18 and therefore a part of it. It further includes a longitudinally adjustable arm shown generally at 22, having its forward end pivotally connected to the vehicle framework 16 at 23 and having its rear end pivotally connected to the linkage 21 at 24. In a conventional three point hitch assembly, the arm 22 is simply a manually adjustable link. This is the area of modification in the instant improvement.

FIG. 4 illustrates the details of arm 22. It includes a forward rod 25 threadably connected to an annular cap 33 on an outer cylindrical casing 26 including a rear spring abutment 27. A rear rod 28 is similarly threadably cone connected to an annular enlargement 34 on an inner tube 30 having a rear spring abutment 31 fixed thereto. Located between the abutments 27 and 31 and in engagement therewith is a relatively heavy compression spring 32. Spring 32 forces abutments 31, 27 against cap 33 and enlargement 34 respectively. The minimum length of the arm 22 is governed by the threaded adjustment of rods 25 and 28 relative to the central spring assembly. The maximum length of arm 22 is governed by the compression of spring 32.

As can be seen in FIGS. 2 and 3, the longitudinally extensible linkage provided by the arm 22 is pivotally connected at its forward end to the vehicle framework 16 about a third transverse axis at the pivotal connection 23 which is parallel to and spaced forwardly from the rotational axis of the blade assembly 11. The rear end of the arm 22 is pivotally connected at 24 about a fourth transverse axis which is spaced parallel to and located above the axis of the blade assembly 11. Arm 22 is therefore located so as to yieldably permit extension thereof to accommodate forward pivotal swinging of the implement frame 18 about the transverse axis provided by the pivotal connections 17.

In practice, arm 22 will normally remain in its retracted position during operation of the rotary cultivator implement. During cultivation, the angular relation of the implement frame 18 relative to the pivotal axis provided by the connections 17 will remain constant in an attitude such as illustrated in FIG. 2. However, should an obstruction be encountered, such as the rock 33 shown in FIG. 3, the rotational force of the blade assembly 11 will cause the implement frame 18 to pivot in a forward direction. This force will then be transferred through the linkage 21 to arm 22, causing extension of arm 22 in opposition to the force of the compression spring 32. The powered rotary blade assembly 11 can therefore work itself over an obstruction under full power without dangerously slowing the power train or transmission. Without this protection, it is common to severely damage or destroy the clutch and transmission mechanisms used to power the blade assembly 11.

The present improvement in the hitch for this particular implement provides the yieldability necessary to protect the drive train to the implement. The forces involved are particularly great due to the power necessary to provide rotary cultivation, and stoppage of the blade assembly is normally destructive of the apparatus. By eliminating such stoppage and providing proper yieldable movement, the instant hitch improvement greatly improves the life of the life of the machinery and permits the use of the rotary cultivator under field conditions that would otherwise be risky and questionable with respect to the safety of the equipment. The improvement requires no additional changes in the tractor or implement or in the power and hitch connections other than the center linkage. It is economical and provides a completely enclosed assembly not subject to external damage. A minimum of moving parts are provided, minimizing the possibility of mechanical difficulty.

Modifications might be made in the extensible arm assembly while presenting substantially the same mechanism, an extensible connection between the two pivotal connections yieldably biased to a normally retracted condition and permitting extension of the distance between the respective pivots. However, the above description is not to limit or restrict the scope of the invention which is set out in the following claims.

I claim:
1. In combination with:
a vehicle including a ground supported framework normally driven in a forward direction;
a rotary cultivating implement of the type including:
a transverse rotary blade assembly;
a frame rotatably supporting the rotary blade assembly for rotational motion about a first transverse axis;
power means operatively connected to the rotary blade assembly for imparting continual rotational movement to the rotary blade assembly about said first transverse axis in such a direction as to move the lowermost portion of the rotary blade assembly in a rearward direction relative to the forward direction of the framework; and
a hitch assembly for mounting the rotary cultivating implement to the vehicle including transverse pivotal support means operatively connecting the implement frame to the vehicle framework about a second transverse axis above and parallel to said first rotational axis;
an improvement in the hitch assembly, comprising:
angular positioning means in the form of a longitudinally extensible arm pivotally connected at one end to the vehicle framework about a third transverse axis parallel to and spaced from said first transverse axis and pivotally connected at its remaining end to the implement frame about a fourth transverse axis parallel to and spaced above said first transverse axis; said arm including biasing means normally maintaining it in a retracted condition and permitting yieldable extension thereof so as to extend the distance separating said third and fourth axes in response to forward pivotal movement of the implement frame about said second transverse axis caused by rotation of the rotary blade.

2. The apparatus set out in claim 1 wherein said arm includes:
a longitudinally extensible assembly including said biasing means; and
a rigid rod operatively connected to said extensible assembly, said rod being longitudinally adjustable relative to said extensible assembly.

3. The apparatus as set out in claim 1 wherein said arm includes:
a longitudinally extensible assembly including said biasing means; and
first and second rigid rods operatively connected to said extensible assembly at opposite ends thereof, said rods being longitudinally adjustable relative to said extensible assembly.

4. The apparatus as set out in claim 3 wherein said extensible assembly comprises:
first and second coaxial tubular members, one slidably received within the other, said tubular members each including a radial abutment fixed thereto at opposite respective ends of the assembly; and
a compression spring located coaxially about and positioned between said tubular members, the ends of said spring being in respective engagement against said abutments.